United States Patent

[11] 3,627,932

[72] Inventors Jim C. Garrett;
Robert H. Johnson, both of 3300 E. Spring St., Long Beach, Calif. 90806

[21] Appl. No. 799,628
[22] Filed Feb. 17, 1969
[45] Patented Dec. 14, 1971

[54] TEST MEANS FOR TELEPHONE SWITCHING SYSTEMS
5 Claims, 12 Drawing Figs.

[52] U.S. Cl. .......... 179/175, 179/175.2 R
[51] Int. Cl. .......... H04m 1/24, H04m 3/08
[50] Field of Search .......... 179/175, 175.21, 175.1, 175.2 R

[56] References Cited

UNITED STATES PATENTS 2,550,819 5/1951 Kessler .......... 179/175
2,732,442 1/1956 Murray .......... 179/175.21

*Primary Examiner*—Kathleen H. Claffy
*Assistant Examiner*—Douglas W. Olms
*Attorney*—Hyman Jackman

ABSTRACT: A compact, lightweight and portable set for testing trunk wiring in telephone step-by-step switching systems, comprising means allowing rapid detection of circuit malfunctions, means to indicate the presence of "false busies" and means to perform such test functions without interfering with working circuits and providing, for the user, the means to communicate with anyone encountered during testing.

INVENTORS
JIM C. GARRETT
ROBERT H. JOHNSON
BY
[signature]
ATTORNEY

INVENTORS
JIM C. GARRETT
BY ROBERT H. JOHNSON

ATTORNEY

INVENTORS
JIM C. GARRETT
ROBERT H. JOHNSON
BY
Seymour Jackman
ATTORNEY

INVENTORS
JIM C. GARRETT
ROBERT H. JOHNSON
BY [signature]
ATTORNEY

INVENTORS
JIM C. GARRETT
ROBERT H. JOHNSON
BY
[signature]
ATTORNEY

INVENTORS
JIM C. GARRETT
ROBERT H. JOHNSON
BY
Hyman Jackman
ATTORNEY

INVENTORS
JIM C. GARRETT
ROBERT H. JOHNSON
BY Hyman Jackman
ATTORNEY

TEST MEANS FOR TELEPHONE SWITCHING SYSTEMS

BACKGROUND OF THE INVENTION

The primary field of use of the present testing means is in the maintenance and foolproof operation of telephone central installations. While others have devised trunk-scanning devices, the same have been lacking in the overall versatility and facility of use of the present means, by which the entire range of malfunctions in the system is uncovered easily and while the system otherwise remains in full operative condition.

Among other test and scanning functions, the present test means possesses the following novel features:

1. Circuitry means to find false busies on straight or reversed trunks, or with either T or R open;
2. Loop-closing circuitry whereby scanning of trunks may be carried out without interference or noticeable noise on busy trunks;
3. Switch means to cause a selector switch to step off the trunks having trouble after the trouble is logged;
4. Circuitry to automatically indicate continuity of the tip and ring conductors of the trunks being tested when trouble is encountered;
5. Provision for stopping on reversed trunks and automatically indicating the condition thereof;
6. Circuitry for monitoring the battery and ground conditions SP lead on four-wire trunks and for testing for sleeve and control lead separation to the connector switch;
7. Talk and listen circuits that are connectable to either the input of the trunk of the "test selector" switch or any of the output trunks that the selector switch can connect to;
8. Circuitry to current flow "A" relays rapidly.

The present test means employs solid-state components for the majority of its sensing and switching circuits. However, three relays are used, namely, "ROT" (rotary), "LP" (loop closing) and "FB" (false busy). Said relays are used in the present means where the circuitry is more straightforward if relays are used than if solid-state components were used. The present test means is designed to operate with a –48 v. battery supply or power that is provided by a telephone central office, and is suitably clipped to the selector means by six connections through a six-conductor test cord. A battery and ground patch cord is also provided.

In this case, the set, on one side thereof, is provided with battery and ROTS jacks 50 and 51 for a suitable battery and ground patch cord, as well as a complement of test cords for connection to trunks to be tested. Also provided is a multisocket 52 for the multiterminal plug on the end of a six-conductor test cord used as a test selector.

Following are definitions of the controls, as marked on the front panel of the test set:

a. A three-position power switch marked "Scan," "Off" and "FB-Verify;"b. "Mon-cut-Thru" (two-position push switch);

c. "Talk" (push-to-talk switch);
d. "Rot Step" (rotary step swtich);
e. "A-Seizure" (switch);
f. "RLS;"
g. Telephone dial;
h. "Vol" (monitor output volume);
i. "A-Adj" (A-relay current adjustment).

In addition to the foregoing, the front panel of the test set has an opening for the speaker-microphone provided for the talk-monitor feature of the set. Also, a milliammeter (10–20 ma.) is used, as well as lamp indicators, marked as follows:

a. "T" (tip verify-continuity);
b. "R" (ring verify-continuity);
c. "S" (sleeve monitor);
d. "REV" (reverse trunk indicator);
e. "FB" (false busy indicator);
f. "SP Batt-Gnd" (condition of SP lead).

SUMMARY OF THE INVENTION

The test set consists of the four following interrelated circuits:

A. Primary Circuit 19: This circuit contains a standard telephone dial 20 to dial the desired level on a test selector switch and a release switch 22 to release the test selector at the end of each scan. A talk and monitor (push-to-talk) switch 23 and a cut-through switch 24 are provided so that the monitor-talk feature can be used on both the primary and the margining circuits within the test set.

B. Margining Circuit 25: The main function of this circuit is to close the path which operates the A relay in the trunks being scanned (tested). As is well known in the art, the A relay, such as shown in FIG. 12, consists of two windings and commonly finds use in selectors, connectors, and repeaters. Under the control of the impulses transmitted by a subscriber's dial, it pulses the switch vertically in the case of selectors and, in the case of connectors, it pulses the switch vertically and then in a rotary direction. While acting primarily as a pulse-repeating relay, it further functions, as seen in FIG. 12, to hold the B relay operated over one of its operated contacts thereby providing a busy indication. Two conditions must be satisfied before the A relay operate path is established: (1) the trunk must not be busy (sleeve conductor of trunk not grounded), and (2) the potential difference between T (tip) and R (ring) conductors must be above a reference value to close a solid-state switch 26. The solid-state switch is in series with normally closed contacts (not operated) of the LP (loop-closing) relay 27. The LP relay operates when a ground condition exists on the sleeve conductor of the trunks tested. When the path is established, the operate current is displayed on a panel milliammeter 185 and is controlled by the adjustment of the A-Adj control 31. An A-Seizure switch 30 is provided to give a 10-millisecond, 20-milliampere, pulse to operate "stiff" A relays.

The reverse polarity-sensing circuitry is energized by the reversed condition on T (tip) and R (ring) conductors of the trunk to light the REV (reverse trunk indicator) lamp 67 if the trunk is idle.

The T (tip) and R (ring) input circuitry 34 and the T and R verify circuitry 35 sense the tip and ring conductor condition when test selectors stop on a trunk, and automatically indicate good continuity by lighting the T and R indicator lamps 64 and 66. If either conductor is open, the associated lamp does not light.

The sleeve indicator lamp 63 lights whenever there is a ground on the sleeve wiper of the test selector, and indicates a busy condition. The ROT Step switch 40 is provided to give a 10-millisecond ground to the test selector sleeve wiper to cause the test selector switch to rotate one step. This switch 40 is normally used when service-affecting trouble is encountered and the test selector switch stops rotary stepping in the normal manner.

C. False Busy Circuit 41: The primary function of this circuit is to indicate a false busy condition, on the sleeve conductor of the trunk with no established loop (conversation) on the tip and ring conductors. The false busy circuit 41 is associated with the loop-closing circuit 42 (LP relay) and can be energized only when the LP relay 27 is operated. The LP relay operates when busy trunks are encountered; therefore, the false busy circuit is used to analyze busy trunks only.

The false busy indicator is used for other trouble indications which are shown in the section on uses below.

D. SP-Battery and Ground Circuit 43: This circuit is used only on four-wire trunks, and when used on such trunks shows the conditions existing on the SP lead of the trunk. This circuit is also connected to the LP relay 27 and will cause it to operate, opening the margining circuit 25 and causing the test selector to stop rotary stepping.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, one embodiment of the present invention, which is given by way of illustration or example only.

BRIEF DESCRIPTION OF THE DRAWINGS

In the drawings, like reference characters designate similar parts in the several views.

DESCRIPTION OF THE PREFERRED EMBODIMENT

Figure 12:
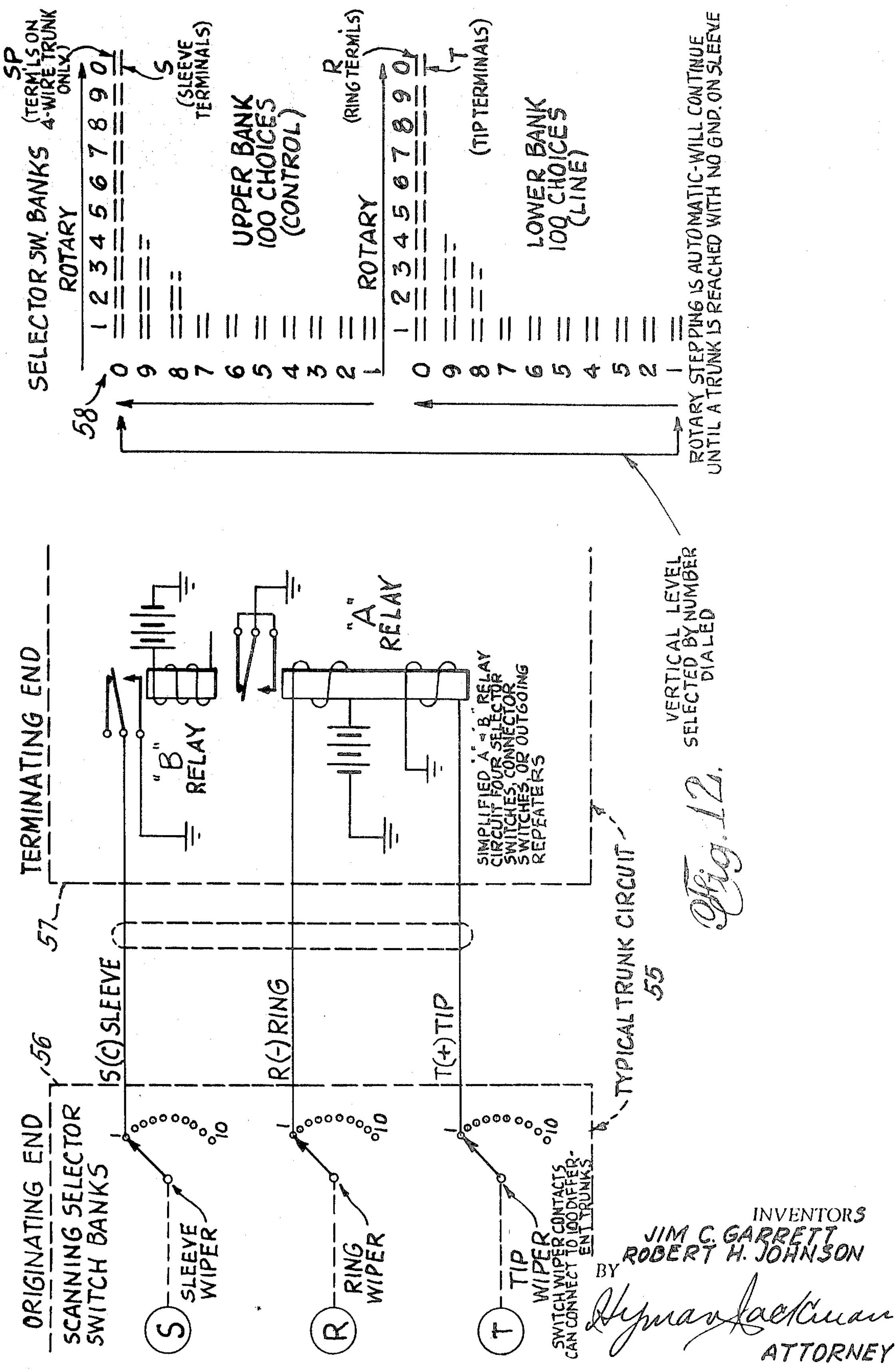
FIG. 12 is a schematic showing a typical trunk circuit of the type which the present invention is adapted to test for various malfunctions.

The generally conventional central office circuit and means shown in FIG. 12 generally comprise trunk circuit 55 comprising an originating end 56 and a terminating end 57, and rotary selector switch banks 58, the same being of the step-by-step type.

The means of the present invention tests the trunks from one selector bank to the next selector of the switch train and checks all the trunks on the switch bank for "opens," "reversals," "crosses" and "busy" conditions. It also monitors the SP leads on four-wire trunks, and tests all busy trunks for either a valid or a false busy condition. It also test current flows the A relays associated with the switch. Further, a sensing circuit keeps the loop open on busy trunks without causing interference with transmission of conversation or data.

The present dial circuit is used to dial and hold the selector that is doing the scanning and which is hereinafter referred to as the test selector. Thus, as will be understood, the device embodying the invention is attached to the selector switch as an auxiliary unit and the selector switch performs the scanning. The monitor circuit is used to detect the presence of dial tone and overglow busy, and in the Mon-Cut-Thru position, monitors the trunk under test, and when used in associated with the talk circuit, enables the testor to communicate with the incoming or outgoing trunk associated with the test selector.

Figure 1:
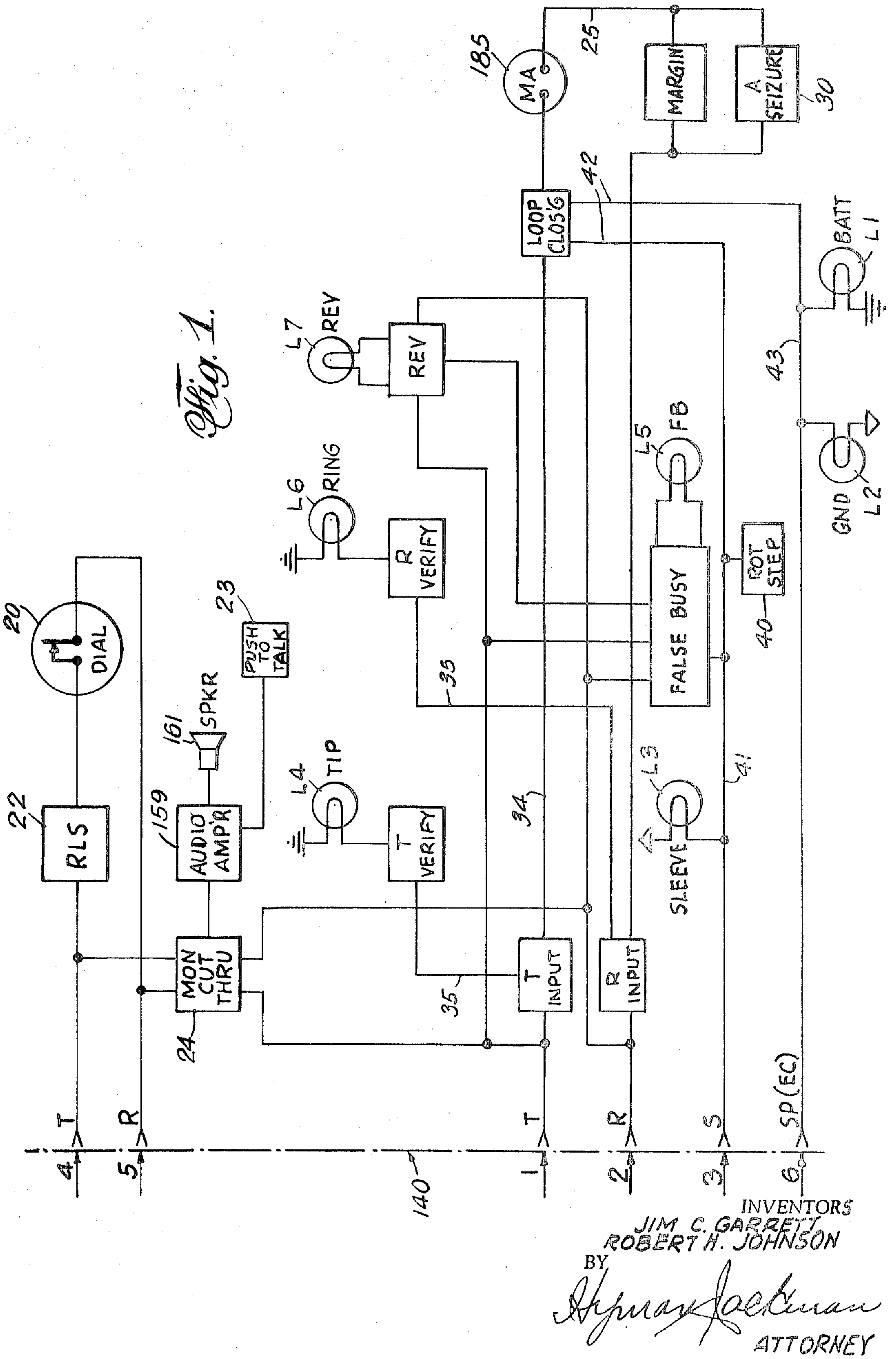
FIG. 1 is a block diagram of electrical components.
Figure 2:
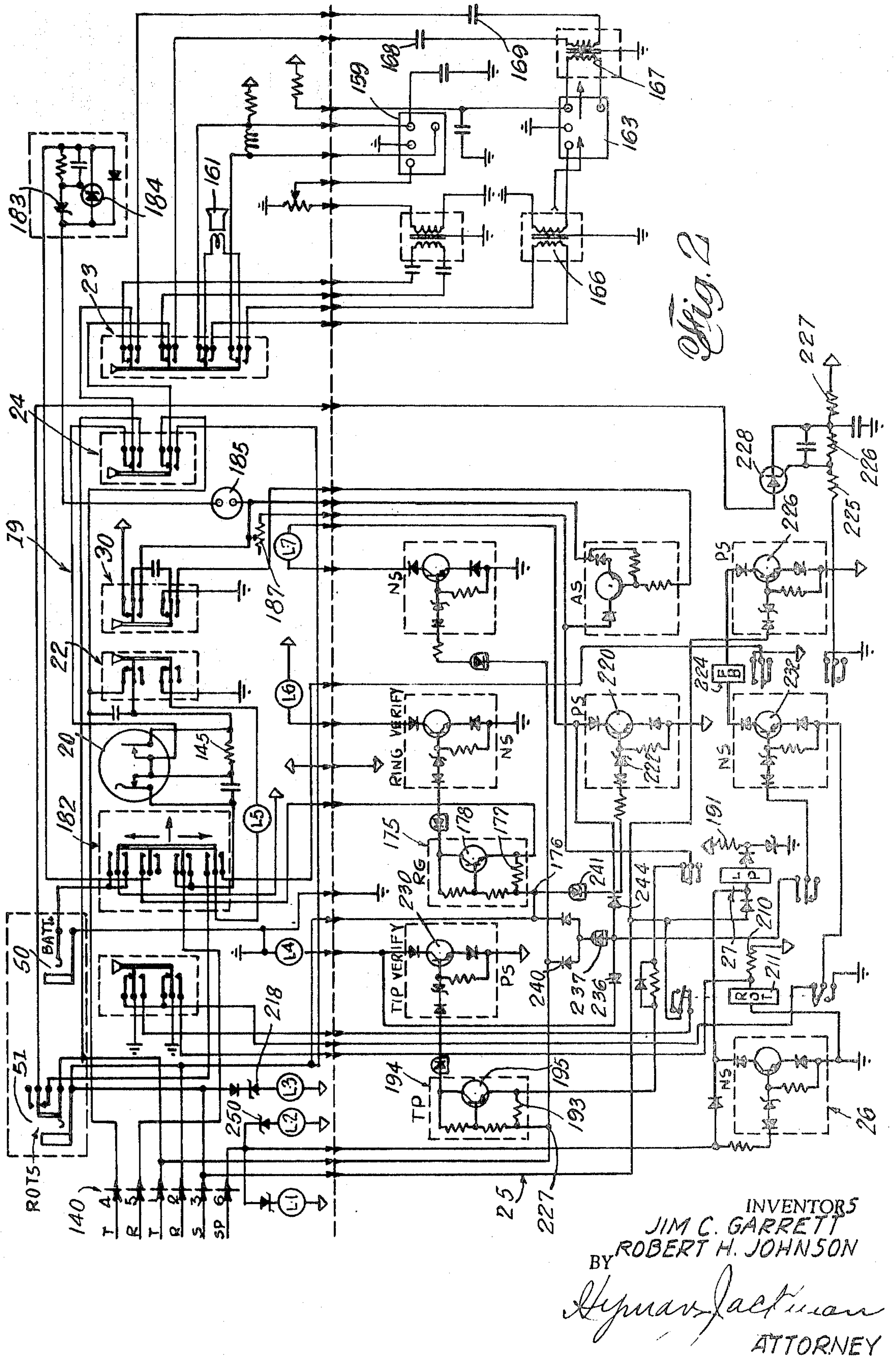
FIG. 2 is a overall electrical schematic of the present test means.
Figures 3, 9:
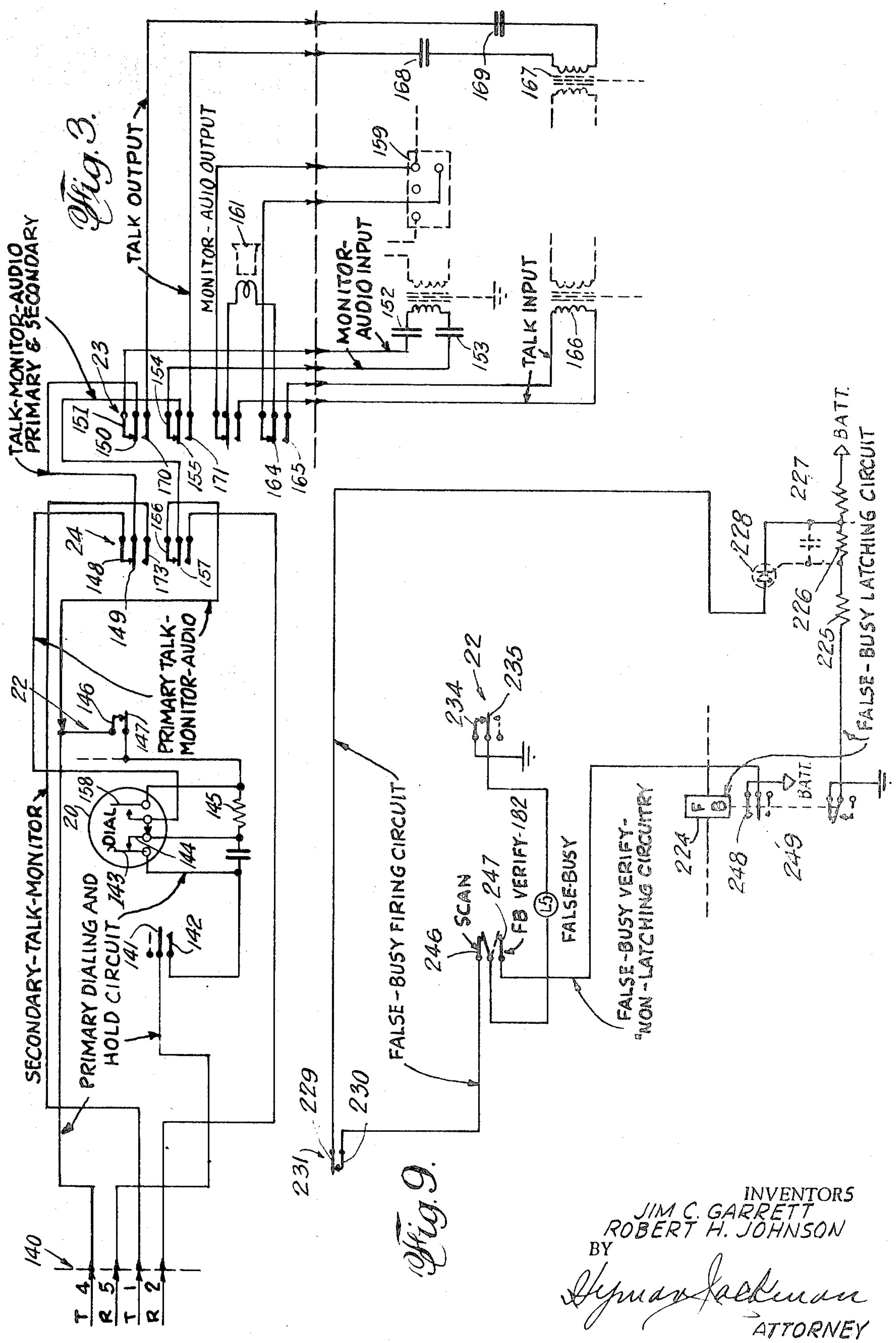
FIG. 3 is an electrical schematic of the primary dialing and talk-monitor and monitor-cut-through phases of the test means.
FIG. 9 is a schematic of the false busy firing and latching circuits and including the false busy verify "non-latching" circuitry.

PHASE I—Primary Dialing Monitor-Talk (FIG. 3)

When the test cord is attached to the test selector, a circuit is provided to operate the A relay and pulse it with the dial pulses as follows:

−48 volts is tied to one side of the A relay: this will be the starting point. Current will flow through the one side of the A relay into pin 5 on the test jack 140 on the 705-B, through contacts 141 and 142 of the "Scan, Off, FB-Verify" switch 51, through dial inpulse springs 143 and 144, through holding resistor 145, through contacts 146 and 147 on the release key 56, out to pin 4 of test jack 140, back through the other side of the A relay to ground. On a first selector, dial tone can be heard at this time. The audio path is from one side of the line through contacts 148 and 149 of the switch 52 through contacts 150 and 151 of the talk button 23, down to capacitor C-3 to transformer T-1, back through capacitors 152 and 153, up to contacts 154 and 155 of the talk button, back to contacts 156 and 157 of switch 52, and back to the other side of the primary line.

When the dial 20 turns counterclockwise, shunt springs 144 and 158 short out the holding resistor 145 and prevent audio clicks during dialing. When released, the dial pulses step the test selector to the desired level; once there, the test selector automatically starts stepping rotary.

The amplifier 159 increases the audio to a level set by the volume control 160 which can be heard in the speaker 161.

To talk, talk button 162 is pressed. This transfers the audio circuit to the amplifier 163. The speaker 161 is now used as a microphone. Voice impulses are transmitted to the speaker and out on contacts 164 and 165 of the talk button 53 to transformer 166 and to amplifier 163, which amplifies the audio and sends it out through transformer 167 (impedance-matching transformer), through capacitors 168 and 169 and through contacts 150, 170, 155 and 171 of the switch 53, back through the switch 52 to the input side of the test selector. This circuit allows conversation back to input. At this time, if the Mon-Cut-Thru switch button 172 is pushed, the monitor-talk circuit will go to the output side of the switch, going through contacts 149 and 173 of the switch 52 to the pins 1 and 2 of the test jack 140, thence to the trunk under test.

Figures 4, 5:
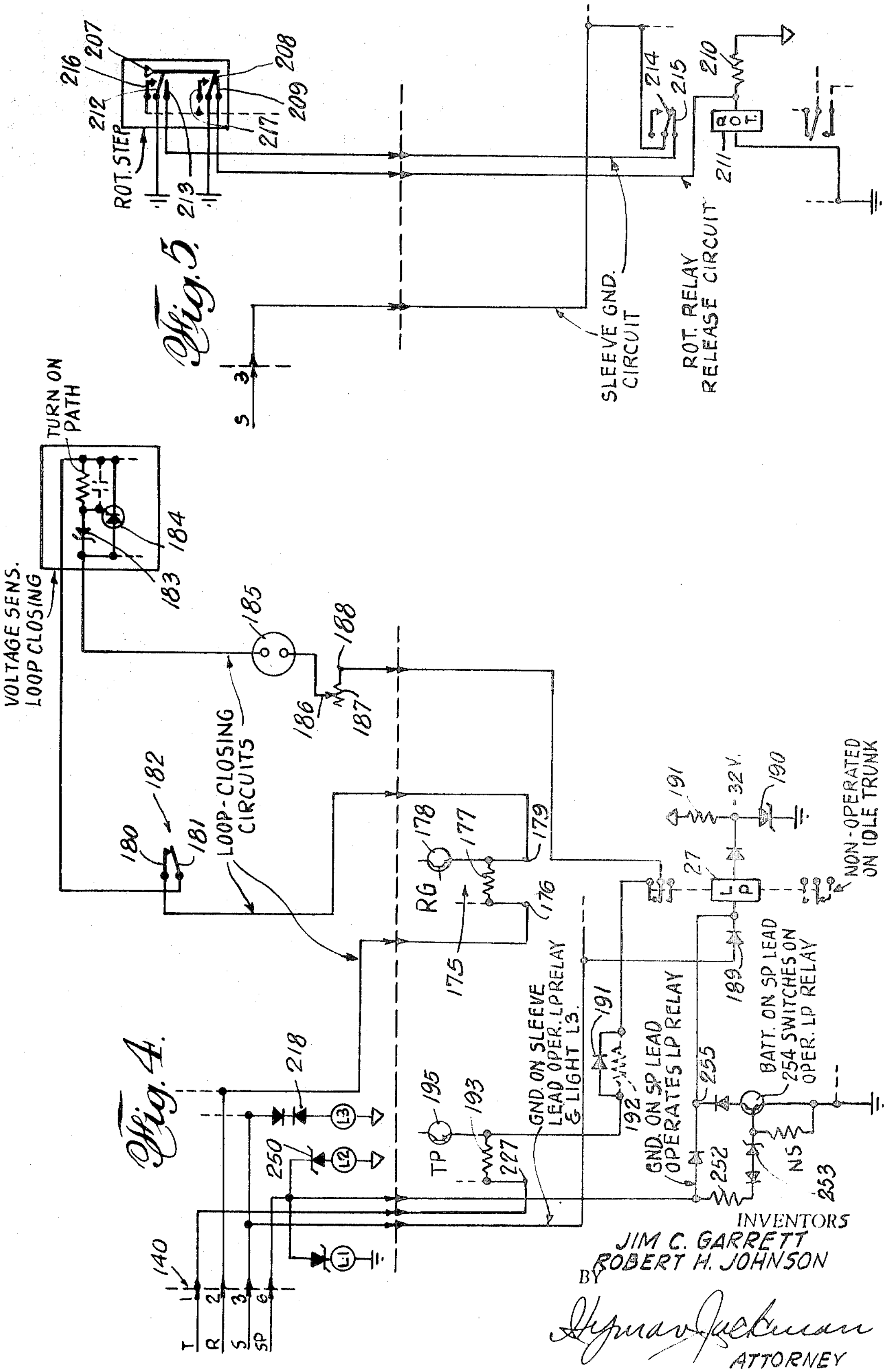
FIG. 4 is a schematic of the margining circuitry and the loop-closing circuits, together with the SP lead and S lead indications, and tip, ring, sleeve continuation.
FIG. 5 is a schematic of the ROT Step circuit.
Figures 6, 7:
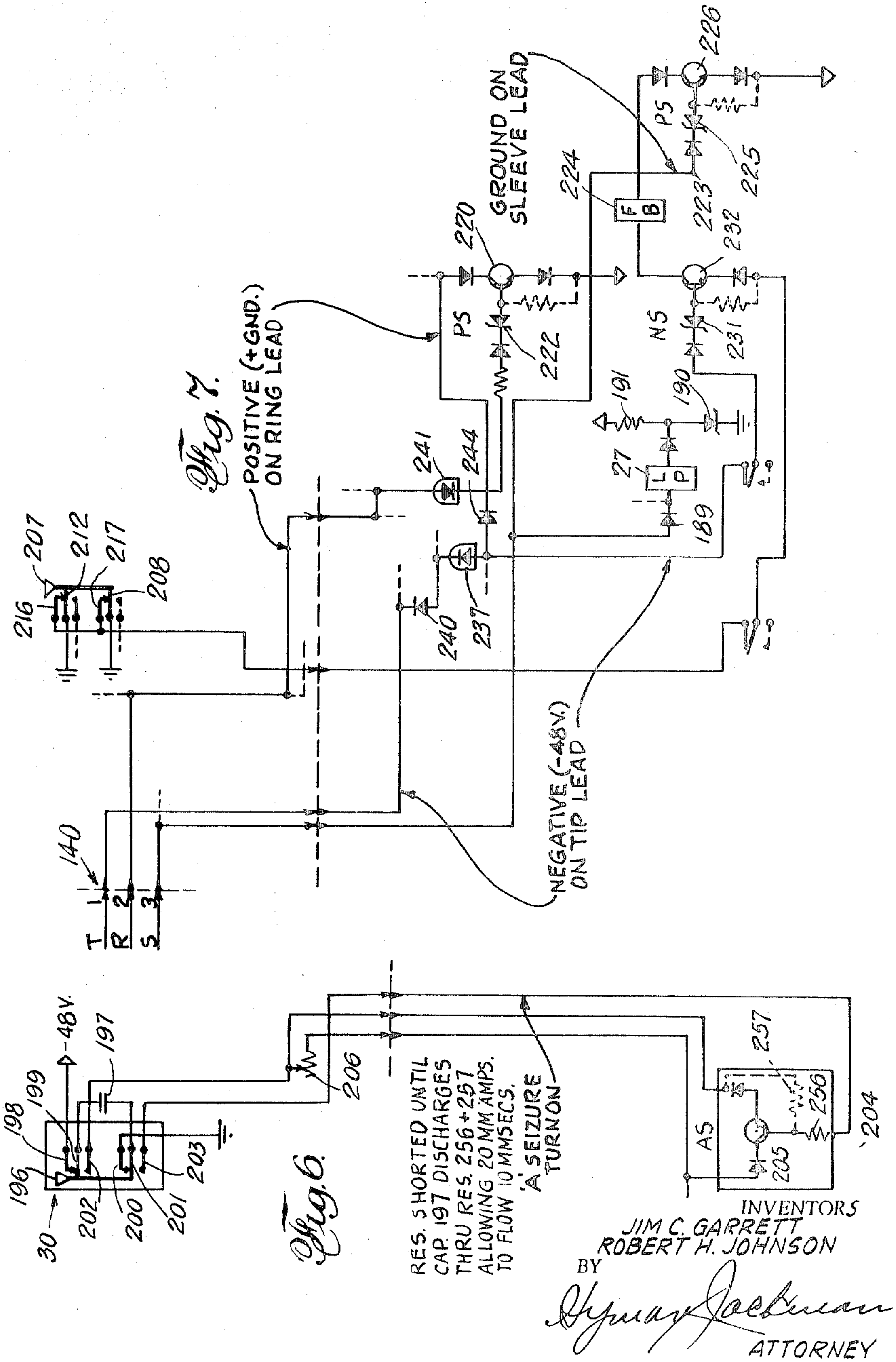
FIG. 6 is a schematic of the A-seizure circuit.
FIG. 7 is a schematic of the false busy input circuitry showing the ring, tip and sleeve leads thereof.

PHASE II - Margining, Polarity, Continuity, Loop-Closing, ROT Step (FIGS. 3, 5 and 6)

General: The main function of the loop within the system is to allow the user to set the current flow in the path of the A relay associated with the trunk under test. Each time the test selector takes a step rotary, each trunk is analyzed for:

1. Busy trunk (true or false busy);
2. Continuity (opens will cause no loop current to flow, allowing the good lead to trigger either the tip or the ring input circuit, automatically switching on the corresponding light);
3. Polarity (a steering diode will switch in resistance on a reversed trunk, preventing seizure of the A relay and allowing the REV lamp to light);
4. Marginal seizure value of A relay;
5. Continuity of sleeve lead and possible crosses;
6. On four-wire selectors (toll), the associated crosses with SP lead, and existence of foreign potential on SP lead.

Once a trunk is tested, it will cause the test selector to step rotary if it is a working trunk; if it is in trouble, in most cases the A seizure button or the ROT Step button must be pushed to allow the user to step off the position and continue rotary stepping.

Any trunk which has a ground on its sleeve will prevent the test set from closing a loop on it; this is due to the loop-closing relay (LP) operating and opening the circuit to the A relay. This causes no interference on talking circuits. During this time, only high-impedance sensing circuits are switched in across the line to test for false busy conditions.

Step-by-Step Circuit Description: Current flow through the margining circuit or loop is in the following manner (see FIG. 4):

From −48 volts on one side of the A relay under test, in pin 2 of test jack 140, into terminal 176 of the RG module 175 (ring input), through resistor 177 (this reverse-biases transistor 178, keeping it turned off), out on terminal 179 of RG through contacts 180 and 181 of the Scan, Off, FB-Verify switch 182, into the voltage-sensing loop-closing circuit, which analyzes the trunk for the presence of a loop caused by a call in progress. If the trunk is idle, there is enough voltage present to cause a Zener diode 183 to conduct, thereby firing the gate of silicon-controlled rectifier 184 across resistor 187.

This loop is now shorted out, closing circuit until the test selector takes a rotary step off the contact, at which time it resets automatically. Once current flows through rectifier 184, it flows through milliameter 185 to terminal 186 of resistor 187, through it, and out on terminal 188 down to the loop-closing relay 27.

The LP relay 27 will be deenergized if the trunk is idle. On a busy trunk, a ground would come in on pin 3 of test jack 140 and into diode 189, through the LP relay to the −32 volt reference set by Zener diode 190 and resistor R-5. This would operate the LP relay, opening the margining loop. Thus, by opening the margining circuit, the circuit including the A adjust resistor 187 shown in FIG. 4 is opened at the operated contact of the LP relay 27.

Current flows through the closed contacts through diode 191. (On a reversed trunk, resistor 192 would be switched into the loop, preventing current from seizing A relay.) Current would then flow through resistor 193 on TP module (keeping transistor 195 turned off), back out to pin 1 of test jack 140, to the other side of the A relay under test, to ground. This operation (if the A relay is properly adjusted) will cause said relay to pull up, in turn operating the B relay which connects circuit ground to the sleeve conductor of the trunk. The test selector recognizes the grounded sleeve conductor as a busy condition and rotary steps automatically to the next idle trunk.

If the tested A relay does not operate on the prescribed seizure value set by resistor 187 (A-Adj), then it can be tested to a maximum of 20 milliamperes by pushing the A-Seizure button 196 (FIG. 6). This switches capacitor 197 (which is precharged to −48 volts in the normal position of the A-Seizure button contacts 198, 199, 200 and 201), down to contacts 199, 202, 201 and 203; this connects the −48 volt reference potential to pin 204 on the AS module. This turns transistor 205 on, shorting resistor 206 for approximately 10 milliseconds, allowing sufficient time for the A relay to operate at the 20-milliamperes current value, if it is only a marginal trouble. If this does not operate the A relay, then the ROT Step button 207 (FIG. 4) is pushed, placing ground through contacts 208 and 209 and down to one end of resistor 210, and also placing ground on both sides of the ROT relay 211, giving it a slow release time of approximately 10 milliseconds.

At this time, ground through contacts 212 and 213 of the ROT Step switch button is placed down through the operated contacts of the ROT relay 214 and 215 out on the sleeve lead 3. This ground will be on the sleeve only for the release time of the ROT relay, allowing the test selector to step on position rotary. Also, during the time when the ROT Step button 207 is pushed, the ground supplied to the NS module of the false busy relay circuitry is removed by opening contacts 216, 212, 217 and 208. This ground will be restored only when the ROT relay 211 releases or the ROT Step button 207 is restored. This is to prevent the false busy circuit from registering a ground on the sleeve while stepping off an SP lead trouble on a four-wire trunk.

Each time a trunk is seized, the returning ground on the sleeve conductor will light the sleeve lamp L-3, giving the user a visual indication. Zener diode 218 is provided to prevent confusion between a −24 volt potential and a ground.

On a reversed trunk due to resistor 192 being in the loop circuit, the test selector will stop on the reversal; the current flow will be very small (1 milliampere) and will not constitute a loop. Thus, the voltage at pins 1 and 2 of the test jack 140 will be of a sufficient level to turn on transistors 219 and 220 by current flow through Zener diodes 221 and 222, respectively. When both transistors 219 and 220 are turned on, lamp L-7 will light, giving a visual indication of a reversed trunk.

Figures 8, 10, 11:
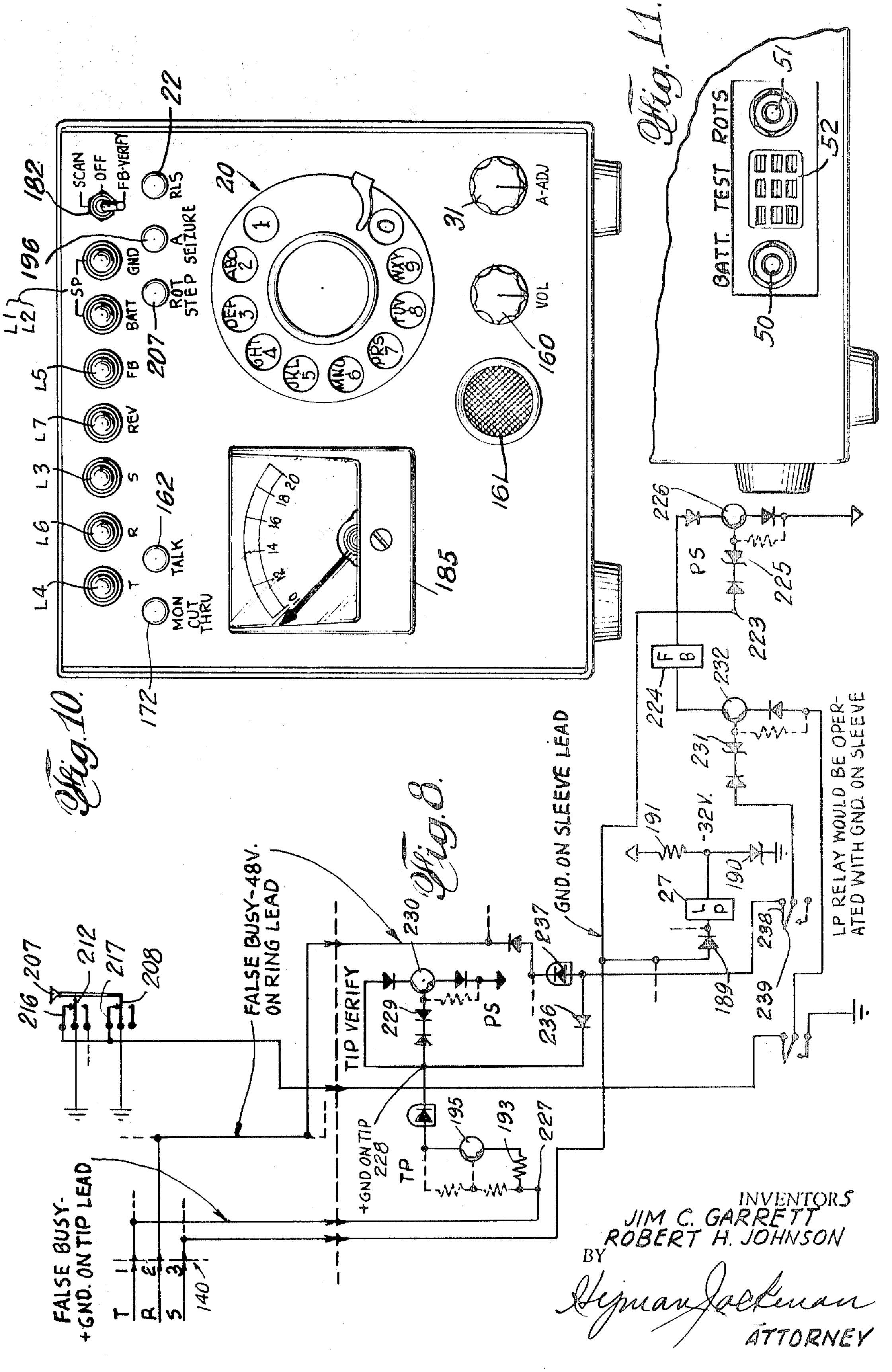
FIG. 8 is a schematic of said false busy input circuitry indicating operating potentials on the LP relay embodied in the sleeve lead.
FIG. 10 is a face view of the test set embodying the present means and showing the controls, instruments and lights thereof.
FIG. 11 is a broken view showing one side of said set and several of the jack connections there provided.

PHASE III - False Busy Circuitry (FIGS. 7, 8 and 9)

General: The false busy circuitry is provided to sense the presence of a foreign ground on the sleeve lead 3. What this means is that a ground exists on the sleeve conductor during a legitimate call and during a conversation. When the switch is not in use (idle), there should be no ground on its sleeve lead. Any time a foreign ground exists on the sleeve lead, the switch would be passed by, as a choice by preceding switches, when actually it is a usable choice. Since a ground on the sleeve automatically makes the test selector step past that choice, it must be analyzed during the 15 to 20 milliseconds in which the test selector passes by it.

The false busy circuit is designed to sense the level of voltage at the tip 1 and ring 2 of test jack 140 in either a straight or reversed polarity on any trunk which shows a ground on the sleeve. When there is a talking loop on a busy circuit, the voltage level at tip or ring would not be sufficient to turn on the required circuitry, even with the ground on the sleeve lead, to register a false busy.

Step-by-Step Circuit Description: The first requirement for a busy trunk, be it a true or a false busy, is a ground on the sleeve lead 3 (FIG. 7). This turns on the first half of the FB circuitry in the following manner:

The ground is sent in on pin 3 of the test jack 140 and goes to pin 223 of the PS module associated with the FB relay 224. This allows Zener diode 225 to conduct, biasing transistor 226 on, and supplying −48 volt battery to one side of the FB relay. At this time, the LP relay 27 is also operated, opening the loop-margining circuit and connecting the inputs to the NS module associated with the FB relay.

Once the LP relay has operated, the false busy NS module has any of four inputs to use in arriving at the other half of a false busy condition, as follows:

1. An idle tip would place ground on pin 1 of jack 140. This would come into pin 227 of the TP module; with the loop held open, resistor 193 cannot hold transistor 195 reverse-biased. Said transistor now switches on, supplying ground to pin 228 of the tip verify module. This allows Zener diode 229 to conduct, biasing transistor 230 on. This supplies −48 volts to turn on the tip lamp L-4. The same −48 volts is brought down through diode 236 to the closed contacts 238 and 239 of the LP relay. The −48 volt potential allows Zener diode 231 to conduct, biasing transistor 232 on. This supplies ground back from the ROT Step button to the other side of the FB relay 224, energizing it. The FB relay operates to supply ground to resistor 225, which is tied back through resistors 226 and 227 to battery. A voltage is now developed across resistor 226, turning silicon-controlled rectifier 228 on, and the same latches on. Said rectifier supplies battery through resistor 227, through the normally closed springs 229 and 230 of the jack 231, through contacts 232 and 233 of the Scan, Off, FB-Verify switch 182, to the FB lamp L-5, through contacts 234 and 235 of the release switch button 22 to ground. This allows the false busy lamp L-5 to light and stay lighted until said release button is pushed at the end of scanning any level.

2. An idle ring would supply −48 volts to pin 2 of the test jack 140 and through diode 236 and diodes 237 to the closed contacts 238 and 239 of the LP relay 27 to turn on transistor 232 in the same manner as in input step (1).

3. A reversed idle tip would supply −48 volts in on pin 1 of the test jack 140, and it would come through diode 240 and through diodes 237 to the LP relay contacts 239 and 238 and turn on transistor 232 as in input step (1).

4. A reversed idle ring will supply a ground on pin 2 of the test jack 140. This ground would come through diodes 241 through resistor 242 and allow Zener diode 222 to conduct biasing on transistor 220. This would supply −48 volts to pin 243 of the PS module, and feed it back through diode 244 to the LP relay 27, which turns on transistor 232, the same as in step (1). The trunk scan embodying the invention is responsive to the movement of the selector switch in stepping across each level of ten terminals, as shown in FIG. 12, for example, so that when a reverse polarity is encountered on the tip or ring line conductors, this amounts to a reverse condition. The trunk scan of the present invention stops in response to a reverse polarity indication whereby the reverse lamp L7 becomes lit.

Since the false busy circuitry is latching in the scan position of the switch 182, it is necessary to provide a non-latching mode in order to test each trunk for tip, ring and sleeve light indications and provide a means for checking trunks which might follow a false busy condition for the existence of the same or similar conditions as a prior false busy. This is accomplished in the following manner:

The Scan, Off, FB-Verify switch 182 is placed in the FB-Verify position. This automatically opens the margin loop at contacts 180 and 181 on the switch 182 as contact 5 now makes contact with contact 245. Also, on the same switch, the −48 volts supplied to the FB lamp L-5 is now coming through contacts 246 and 247, and goes back to the FB relay 224 directly through FB relay contacts 248 and 249 to battery, when it is operated.

It was earlier mentioned that the false busy latching path is through the normally made contacts on the ROTS jack 23. This is necessary to remove the false-busy-indicating circuit while testing ROTS (rotary out trunk secondaries). This is due to the difference in their stepping speed compared to a normal step switch. However, it does not affect the false-busy-verify mode which is used as a second test operation on this type of switch.

PHASE IV—SP-Indicating Circuitry (FIG. 4):

General: On toll selectors, a fourth wire is used to control supervision of certain functions during a toll call. The wire has no connection within the selector; it is only a path through the selector. Therefore, there should not be present a ground (+) or battery (−48 v.) potential until a ground is placed there during a specific test function, in which a ground is sent back from a forward point for a period of time to indicate continuity of the SP lead 6 of the jack 140.

As such, the SP-indicating circuit is only to give a visual indication of this potential.

Step-by-Step Circuit Description: If a ground (+) is encountered on a scan test on the SP lead, it will come in on pin 6 of the test jack 140 and allow Zener diode 250 to conduct, and lamp L-2 will light (LP-ground). It will also go through diode 251 and operate the LP relay 27, opening the loop-margining circuit. This allows the test selector to stop on the trouble.

If a −48 volt potential appears on the SP lead, it would come in on pin 6 of the test jack 140, turning on lamp L-1 (Sp-Batt), also coming down through resistor 252 and allowing Zener diode 253 to conduct, biasing transistor 254 on, supplying ground out on pin 255, and feeding ground to operate the LP relay 27 to open the loop circuit.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. Testing means for monitoring the operation of a line relay of the two-winding type provided in trunk wiring in telephone central step-by-step switching systems, comprising:

a. a primary electric circuit provided with a test selector switch to release the former at the end of a monitoring operation and including a telephone dialing means for generating impulsing signals to dial a desired level on the selector switch;

b. a talk switch and a cut-through switch provided serially in said primary circuit for monitoring selectively the trunk under test and enabling communication with trunks associated with said selector switch;

c. a margining circuit including voltage-sensing means for completing a path to energize said line relay in a trunk being monitored; and d. said talk switch and said cut-through switch being responsive to said impulsing signals which operate said primary and margining circuits.

2. Testing means as defined in claim 1 and including:

a. a false busy circuit for analyzing busy trunks being monitored whereby an indication is provided in response to an idle trunk having a ground potential thereon;

b. a loop-closing circuit operatively associated with the false busy circuit and including a loop-closing relay which is energized when a busy trunk is encountered.

3. Testing means as defined in claim 2 and provided with:

a. a battery and ground circuit adapted for testing use only in connection with monitoring of four-wire trunks, b. said circuit being operatively connected to said loop-closing relay to operate said relay and opening said margining circuit to cause the test selector to stop rotary stepping.

4. Testing means as defined in claim 1 and including an amplified listen-in circuit, selectively connectable to either the input of the trunk of the test selector switch or any of the output trunks adapted for operative engagement with said switch.

5. Testing means as defined in claim 1 in which the dial pulses of the dialing means in the primary circuit step the test selector to the desired level, said selector from said level automatically starting stepping rotary, and including:

a. a circuit-holding resistor means serially connected in the circuit through said line relay under test, and b. shunt means to short out said resistor means to eliminate audio clicks during operation of said dialing means.

* * * * *